United States Patent
Borzone

(10) Patent No.: US 6,916,376 B2
(45) Date of Patent: Jul. 12, 2005

(54) PAINTING BOOTH, PREFERABLY OF THE ELECTROSTATIC PAINTING TYPE

(75) Inventor: Achille Borzone, Cernusco sul Naviglio (IT)

(73) Assignee: Transmetal S.p.A., Milan (IT)

( * ) Notice: Subject to any disclaimer, the term of this patent is extended or adjusted under 35 U.S.C. 154(b) by 3 days.

(21) Appl. No.: 10/608,014

(22) Filed: Jun. 30, 2003

(65) Prior Publication Data

US 2004/0144307 A1 Jul. 29, 2004

Related U.S. Application Data

(63) Continuation of application No. 10/257,138, filed as application No. PCT/EP01/04358 on Apr. 17, 2001.

(30) Foreign Application Priority Data

Apr. 21, 2000 (IT) ...................................... MI2000A0909

(51) Int. Cl.[7] ........................... B05C 15/00; B05C 19/00
(52) U.S. Cl. ......................... 118/309; 118/326; 118/70; 118/324; 118/DIG. 7; 454/50; 55/DIG. 46
(58) Field of Search ................................ 118/309, 308, 118/326, DIG. 7, 70, 313, 324; 55/DIG. 46; 454/50

(56) References Cited

U.S. PATENT DOCUMENTS

| 4,323,030 | A |   | 4/1982  | Lehmann |
| 5,056,459 | A |   | 10/1991 | Urban et al. |
| 5,152,839 | A |   | 10/1992 | Boyce et al. |
| 5,690,995 | A | * | 11/1997 | Fischli et al. ............... 427/180 |
| 5,693,143 | A |   | 12/1997 | Pham et al. |

* cited by examiner

Primary Examiner—Chris Fiorilla
Assistant Examiner—Yewebdar Tadesse
(74) Attorney, Agent, or Firm—Connolly, Bove, Lodge & Hutz, LLP

(57) ABSTRACT

A painting booth, which includes: a frame which supports a plurality of movable walls (3) made of deformable material, whose internal surfaces bound a volume which can contain objects to be painted; at least one distributor arranged inside the volume and suitable to distribute painting powders meant to be applied to the surface of the objects to be painted; and removable means (10) which are suitable to interact operatively with the movable walls, so as to facilitate the removal of residual painting powders which deposit on their internal surfaces; and actuation means (6, 7, 11) which are suitable to move the movable walls with respect to the removal means. The actuation means include coupling means (11) for coupling to the movable walls, which are suitable to move the movable walls so as to keep the internal surfaces constantly taut.

18 Claims, 1 Drawing Sheet

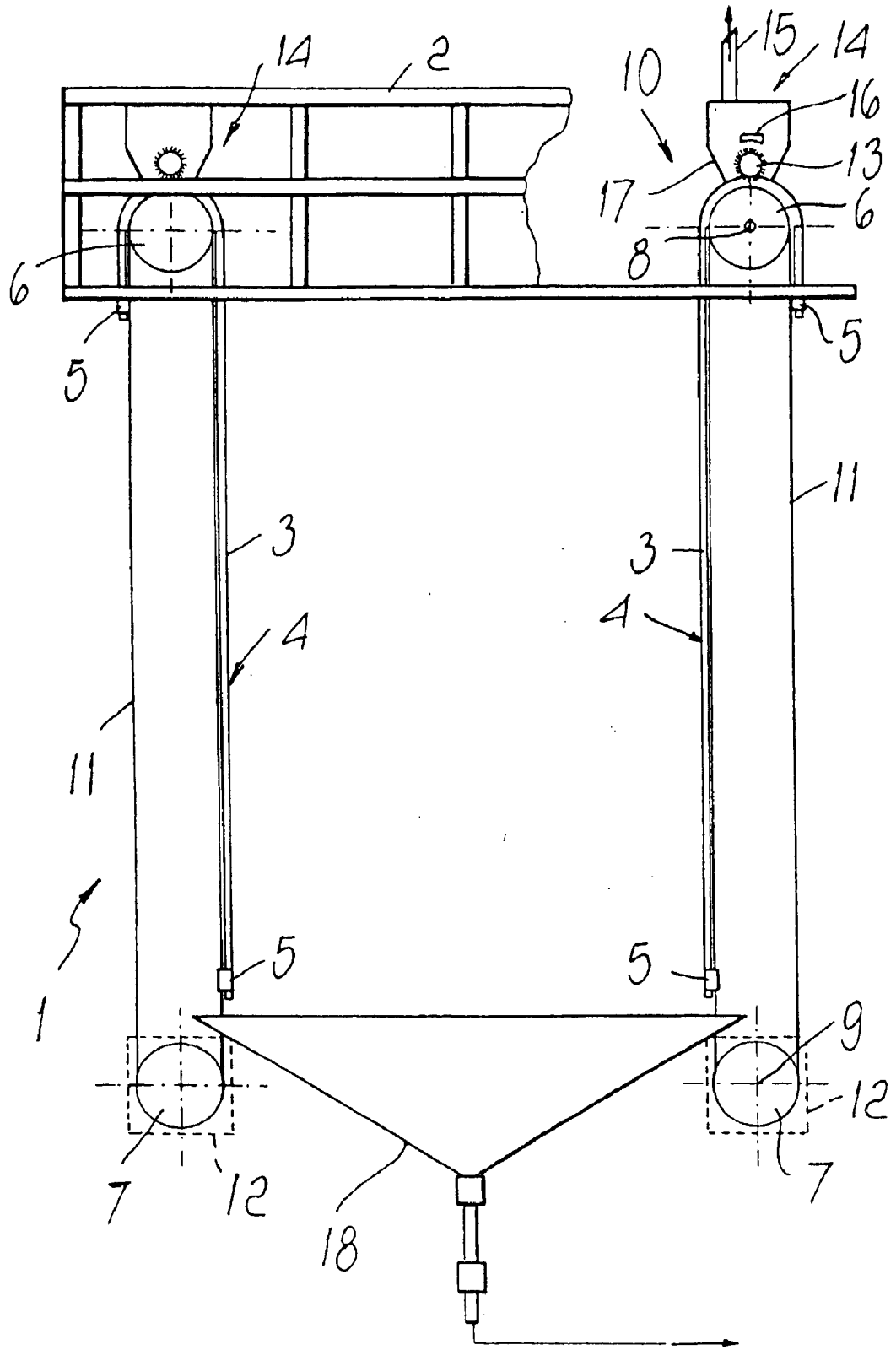

PAINTING BOOTH, PREFERABLY OF THE ELECTROSTATIC PAINTING TYPE

CROSS-REFERENCE RELATED APPLICATIONS

The present application is a continuation application of Ser. No. 10/257,138, filed Oct. 9, 2002; now abandoned, which is national stage of PCT/EP 01/04358, filed Apr. 17, 2001; which claims priority from Italian application MI2000A000909, filed Apr. 21, 2000.

The present invention relates to an improved painting booth, preferably of the electrostatic painting type.

It is known in the art that painting booths, particularly of the type for electrostatic painting, have a structure, which includes a frame that supports a plurality of walls, arranged so that their internal surfaces bound a volume, which is suitable to accommodate one or more distributors of painting material, typically organic painting powders. Painting is performed by passing the workpieces to be painted through the volume of the booth, along circular or elliptical paths around the corresponding distributor. In turn, the distributor, for example of the linear type having a circular shape, is moved, during the powder spraying step, along a vertical axis, so as to increase its operating range. In order to allow efficient bonding of the powder to the part, an electrostatic field is generated around the distributor by virtue of appropriate electrodes, which are supplied by a high-voltage source. In this manner, the particles of paint sprayed by the distributor are electrostatically charged and can deposit on the surface of the workpiece, which is at a different potential with respect to the distributor.

The structure of the booth, and particularly of its walls, is meant to perform two main functions among others. The first function relates to the need to have deposition surfaces, onto which the powders that do not adhere to the workpieces to be painted settle, thus preventing them from spreading into the surrounding environment. The second function relates to the need to remove the unused powders from the walls, on which they have deposited, in order to at least partially recover and reuse them and most of all to prevent, during subsequent painting operations with other colors, said powders from detaching and depositing on the workpieces, thus spoiling the intended final coloring to be obtained.

In this regard, the art has adopted several solutions, which allow to clean the internal surfaces of the walls of the booth. Although they allow adequate removal and recovery of the powders deposited thereon, they currently have some drawbacks.

In particular, next to more conventional solutions, which entailed the direct intervention of operators who manually clean the walls or replace them at every color change, with a negative impact on production costs and times, more advanced solutions have been developed, which allow to simplify the operations for cleaning the surface of the walls and reduce labor intervention.

These solutions use movable walls, generally made of deformable material, for example sheets of plastics, which are moved with respect to paint powder removal systems by using appropriate actuation mechanisms, for example of the winch type, and are rolled up on a takeup roller. During the roll-up step, the removal systems facilitate the separation of the powder from the wall and its conveyance toward recovery devices. An example of a solution of this kind is described in U.S. Pat. No. 5,065,459. At the end of the cleaning operation, the sheets are unrolled and repositioned for the subsequent painting process.

The main drawback of this type of solution is the fact that the system for rolling up the movable walls produces creases and wrinkles in said walls. Accordingly, regions can form, in which the removal systems cannot ensure effective and uniform separation of the powder from the walls, and the powder therefore remains attached thereto and causes the above cited technical drawbacks.

The aim of the present invention is to provide a painting booth, which allows to obviate the drawbacks of the prior art and in particular allows to achieve uniform and substantially complete cleaning of the walls affected by the deposition of residual painting powder, in a way which is functionally effective and at the same time cheap.

This aim is achieved by a painting booth, which comprises:

a frame, which supports a plurality of movable walls made of deformable material, whose internal surfaces bound a volume, which can contain objects to be painted, at least one distributor being arranged inside said volume and being suitable to distribute painting powders meant to be applied to the surface of said objects to be painted; and removal means, which are suitable to interact operatively with the movable walls, so as to facilitate the removal of residual painting powders which deposit on their internal surfaces; and actuation means, which are suitable to move said movable walls with respect to said removal means.

The painting booth according to the invention is characterized in that said actuation means comprise coupling means for coupling to the movable walls, said coupling means being suitable to move the movable walls while keeping said internal surfaces constantly taut.

This solution ensures uniform and complete cleaning of the internal surfaces of the walls of the booth, since it prevents the possibility of creases or wrinkles forming during the cleaning steps and therefore producing regions, in which cleaning means lose the functional effectiveness for which they are used.

Further characteristics and advantages of the invention will become better apparent from the description of preferred but not exclusive embodiments of the painting booth, according to the invention, which are illustrated, only by way of non-limitative example in the accompanying drawings, wherein:

FIG. 1 is a schematic front view of a painting booth, according to the invention.

With reference to FIG. 1, the painting booth according to the invention, generally designated by the reference numeral 1, comprises a frame 2, which supports a plurality of movable walls 3 that are made of deformable material, for example plastics. For the sake of clarity in illustration, only two side walls 3 are shown in FIG. 1. In this embodiment, each movable wall 3 is constituted by a substantially flat sheet made of deformable material, for example polytetrafluoroethylene, which is known commercially by the trade-name Teflon. Alternatively, it is possible to use other kinds of material, so long as they are compatible with the application, such as materials, which do not facilitate the deposition of powders on their surface.

The internal surfaces 4 of the movable walls 3 bound a volume, which can accommodate objects to be painted, not shown in FIG. 1. Furthermore, at least one distributor (also not shown in FIG. 1) is placed inside said volume and is suitable to distribute painting powders, which is meant to be applied to the surface of the objects to be painted. For example, the distributor used can be a linear pneumatic distributor of the circular type, whose embodiment and operating methods are widely known in the art and are therefore not described further.

The painting booth 1 furthermore comprises removal means, generally designated by the reference numeral 10, which are suitable to interact operatively with the movable walls 3, so as to facilitate the removal of residual painting powders which deposit on their internal surfaces 4 during painting. Actuation means, which are suitable to move said movable walls 3 with respect to the removal means 10, are further included.

The actuation means comprise coupling means for coupling to the movable walls 3, which are suitable to move, rigidly with them, the movable walls 3 so as to keep their internal surfaces 4 constantly taut. This avoids the forming of creases and/or wrinkles of the surfaces 4 during the steps for cleaning off the residual painting powders, which may deposit on the walls 3, thus allowing uniform and effective cleaning of said surfaces.

In particular, in the embodiment shown in FIG. 1, the coupling means for coupling to the movable walls 3 comprise, for each movable wall 3, a first roller 6 and a second roller 7, which are arranged so that their axes 8 and 9 are substantially parallel to each other and lie at right angles to the vertical extension of the painting booth. The coupling means furthermore comprise at least one ribbon-like belt 11, which is arranged on the rollers 6 and 7 and is operatively connected to a corresponding movable wall 3. According to a preferred embodiment, each movable wall 3 has a first end and a second end, which are rigidly engaged with the corresponding belt 11, for example by virtue of clip systems, schematically designated by the reference numeral 5 in the FIGURE. Alternatively, the movable wall 3 can have a first end rigidly coupled to the corresponding ribbon-like belt 11 and a second end to which at least one counterweight is connected, said counterweight being suitable to tension the surface of said movable wall 3. Preferably, the coupling means comprise two ribbon-like belts, which are arranged on the rollers 6 and 7 and are mutually spaced along the extension of the axes of said rollers. In this manner, a better coupling with the walls 3 and better tension of the surface of said wall are achieved. Alternatively, three or more belts might be used.

The removal means 10 comprise at least one brush, schematically designated by the reference numeral 13, which is operatively associated with a corresponding movable wall 3 and is suitable to brush its internal surface so as to detach therefrom the painting powder that has deposited thereon. As shown in the figure, the brush 13 is arranged at the first roller 6 and lies substantially along the entire depth of the movable wall with which it is associated, so as to ensure uniform cleaning along said entire depth.

Alternatively, instead of the brush 13 it is possible to use at least one blade, which is operatively associated with the corresponding movable wall 3 and is suitable to scrape its internal surface 4. Said blade, too, can be arranged at the roller 6 and runs along the entire depth of the associated wall.

In a preferred embodiment of the present invention, the removal means 10 comprise at least one suction device 14, which is associated with a corresponding movable wall 3 and is used together with the brush 13 or the blade mentioned above. The suction device 14, also preferably arranged proximate to the roller 6 and in an enclosure 17, which also contains the brush 13 (or the mentioned blade), comprises a pneumatic circuit 15 and a suction section 16, which runs along the entire depth of the movable wall 3. The device 14 allows to generate a suction flow on the surface 3 and therefore to aspirate, through the suction section 16, the painting powder that has deposited on the internal surface of said wall and on said brush. Said powder is then advantageously conveyed into the ducts of a recovery system.

The combined action of the suction device 14 and of the brush 13, or of the blade, allows to increase the effectiveness of the powder removal action, according to a solution which is nonetheless simple and compact in its embodiment and advantageous from the economical point of view.

Alternatively, and according to the various application requirements, the brush 13 (or the mentioned blade) and the suction device 14 can be positioned differently along the wall, or it is possible to use only one of said removal means. Furthermore, if required by the application, a blower can be coupled to the suction device 14 in order to produce an air flow in the opposite direction to the flow generated by the suction device 14, so as to increase the effectiveness of the cleaning operation.

Finally, the actuation means comprise at least one motor 12, which is operatively associated with one of the rollers, for example, as shown in the figure, with the roller 7 or with the roller 6. In particular, it is possible to use one motor for each wall 3 or a single motor, which is connected to the various rollers by virtue of appropriate transmission mechanisms.

In practice, after painting, during the cleaning of the movable walls, the motor 12 is activated, causing the rotation of the two rollers 6 and 7 and of the corresponding belts 11 coupled thereto. In turn, the belts 11 move, substantially rigidly with them, the movable wall 3, which moves so that its internal surface 4 remains constantly taut. Proximate to the roller 6, the brush 13 (or the mentioned blade) brushes the surface 4, causing a first cleaning of the powder deposited thereon. Then, the suction device 14 sucks up the powder, causing further and final cleaning of the wall, and furthermore allows to suck up the powder that possibly deposits on the surface of said brush (or blade).

The powder which, during painting, deposits neither on the workpiece to be painted nor on the walls 3 falls to the bottom of the booth, where a recovery system 18, for example with vibrating funnel-shaped walls, facilitates its recovery.

The painting booth, according to the present invention, is susceptible of numerous modifications and variations, all of which are within the scope of the inventive concept; all the details may furthermore be replaced with other technically equivalent elements. In practice, the materials and the dimensions may be any according to the requirements and the state of the art.

What is claimed is:

1. A painting booth comprising:
    a frame, which supports a plurality of movable walls made of deformable material, the internal surfaces of said plurality of movable walls bounding a volume, which can contain objects to be painted, at least one distributor being arranged inside said volume and being suitable to distribute painting powders meant to be applied to the surface of said objects to be painted; and
    removal means, which are suitable to interact operatively with said plurality of movable walls, so as to facilitate the removal of residual painting powders which deposit on the internal surfaces of said plurality of movable walls; and
    actuation means which are suitable to move said plurality of movable walls with respect to said removal means;
    wherein said actuation means comprise coupling means for coupling to said plurality of movable walls, said coupling means being suitable to move the plurality of moveable walls so as to keep said internal surfaces constantly taut, and wherein said coupling means comprise, for at least one of said movable walls, a first roller and a second roller, which are arranged so that their axes are substantially parallel to each other and are perpendicular to the vertical extension of the cabin, at least one belt being arranged on said first and second plurality of movable walls being operatively connected to said at least one belt.

2. The painting booth according to claim 1, wherein each of said movable wall is made of a sheet of deformable material, said sheets having a first end and a second end which are rigidly coupled to the at least one belt.

3. The painting booth according to claim 1, wherein each of said movable wall is provided as a substantially flat sheet which has a first end which is rigidly coupled to the at least one belt and a second end to which at least one counterweight is connected.

4. The painting booth according claim 1, wherein said coupling means comprise two belts, which are arranged on said first and second rollers and are mutually spaced along the extension of the axes of the first and second rollers.

5. The painting booth according to claim 1, wherein said removal means comprise at least one brush which is operatively associated with a corresponding movable wall and is suitable to brush the internal surface of said movable wall.

6. The painting booth according to claim 1, wherein said removal means comprise at least one suction device, which is associated with a corresponding movable wall and has a suction section which is suitable to aspirate the painting powder deposited on the internal surface of said wall.

7. The painting booth according to claim 1, wherein said removal means comprise at least one blade, which is operatively associated with a corresponding movable wall and is suitable to scrape its internal surface.

8. The painting booth, according to claim 1, wherein said removal means comprise at least one brush and at least one suction device, which has a suction section, said at least one brush and said suction device being operatively associated with a corresponding movable wall and being respectively suitable to brush the internal surface of said wall and to aspirate therefrom the painting powder deposited thereon.

9. The painting booth according to claim 1, wherein said removal means comprise at least one blade and at least one suction device which has a suction section, said at least one blade and said at least one suction device being operatively associated with a corresponding movable wall and being respectively suitable to skim the internal surface of said wall and to aspirate therefrom the painting powder deposited thereon.

10. The painting booth according to claim 8, wherein said at least one brush and/or said at least one suction device are arranged at said first roller, said brush and/or the at least one suction device being arranged substantially along the entire depth of the movable wall with which they are associated.

11. The painting booth according to claim 9, wherein said at least one blade and/or said at least one suction device are arranged at said first roller, said at least one blade and/or the at least one section of the suction device being arranged substantially along the entire depth of the movable wall with which they are associated.

12. The painting booth according to claim 1, wherein said actuation means comprise at least one motor, which is operatively associated with one of said first and second rollers.

13. The painting booth according to claim 12, wherein said actuation means comprise a motor for one or more of said movable walls.

14. The painting booth according to claim 12, wherein said actuation means comprise a single motor, which is operatively associated with two or more of said movable walls.

15. The painting booth according to claim 2, wherein said coupling means comprise two belts, which are arranged on said first and second rollers and are mutually spaced along the extension of the axes of the first and second rollers.

16. The painting booth according to claim 3, wherein said coupling means comprise two belts, which arranged on said first and second rollers and are mutually spaced along the extension of the first and second rollers.

17. The painting booth according to claim 2, wherein said removal means comprise at least one brush, which is operatively associated with a corresponding movable wall and is suitable to brush the internal surface of said plurality of movable walls.

18. The painting booth according to claim 3, wherein said removal means comprise at least one brush, which is operatively associated with a corresponding movable wall and is suitable to brush the internal surface of said plurality of movable walls.

* * * * *